US008246181B2

(12) United States Patent
Davis et al.

(10) Patent No.: US 8,246,181 B2
(45) Date of Patent: Aug. 21, 2012

(54) APPARATUS HAVING TWO FUNCTIONS

(75) Inventors: Brittany Davis, Genola, UT (US); Peter On, Corvallis, OR (US); Glen A. Oross, Corvallis, OR (US); John Gilman, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1980 days.

(21) Appl. No.: 11/260,070

(22) Filed: Oct. 26, 2005

(65) Prior Publication Data

US 2007/0091286 A1    Apr. 26, 2007

(51) Int. Cl.
*G03B 21/00* (2006.01)
*G03B 21/22* (2006.01)
(52) U.S. Cl. .......................................... 353/122; 353/71
(58) Field of Classification Search .................... 353/71, 353/119, 122; 312/10.1; 368/10, 72, 244; 348/789, 836
See application file for complete search history.

(56) References Cited

U.S. PATENT DOCUMENTS

| | | | | | |
|---|---|---|---|---|---|
| 2,732,816 | A | * | 1/1956 | Stein | 109/59 R |
| 3,672,269 | A | * | 6/1972 | Tabankin | 396/427 |
| 5,211,456 | A | * | 5/1993 | Staffaroni | 312/10.1 |
| 5,261,645 | A | | 11/1993 | Huffman | |
| 5,366,203 | A | | 11/1994 | Huffman | |
| 5,537,369 | A | * | 7/1996 | Wu | 368/10 |
| 5,551,658 | A | | 9/1996 | Dittmer | |
| 5,640,215 | A | | 6/1997 | Catta | |
| 6,637,711 | B2 | | 10/2003 | Enochs | |
| 6,811,265 | B2 | * | 11/2004 | Soper et al. | 353/99 |
| 6,935,755 | B2 | * | 8/2005 | Soper et al. | 353/122 |
| 6,961,286 | B1 | * | 11/2005 | Alagia | 368/10 |
| 2004/0046899 | A1 | | 3/2004 | Bonnett | |
| 2004/0085484 | A1 | | 5/2004 | Soper | |

OTHER PUBLICATIONS

Jerry Del Colliano, "How and Why to Build . . . ", Revolution Home Theater Magazine, Feb. 2004, p. 3; printed from URL: http://www.revolutionhometheater.com/howto/hushbox/main3.shtml.

* cited by examiner

*Primary Examiner* — Hung Henry Nguyen

(57) ABSTRACT

An apparatus having a housing and an opening is covered by a moveable panel, when the panel is in a first position, a first appliance, for example, a clock is presented. When the panel is in a second position, a second appliance, for example, a projector is presented.

18 Claims, 6 Drawing Sheets

US 8,246,181 B2

APPARATUS HAVING TWO FUNCTIONS

BACKGROUND OF THE INVENTION

Due to the recent advent of cost-effective projectors, projectors are becoming fairly common in conference rooms, conference centers, and even homes. Recently, the cost of projectors has dropped, and as a result, some consumers are using projectors in home theater systems rather than using other available technologies, such as cathode ray tubes, rear projection micro-mirror displays, plasma displays, or liquid crystal displays. Besides the potential cost advantage a projector has over alternate technologies, the projector weighs less and takes up less space than other display technologies.

However, there are some drawbacks to using a projector. Projectors, with their necessary power cords and cables tend to create trip hazards, create significant set up and tear down time, and present clutter, thereby potentially distracting audiences from the content of the projected presentation. Projectors present other potential sources of distraction, such as light leakage, noise from a cooling fan, and highly localized exhaust heat. Specifically, when a projector is placed on a table and an image is projected to a screen or other surface that is substantially above the projector height, the height mismatch causes the projector and the projection surface to be at an oblique angle, thereby distorting the projected image. Placing a projector on a table also subjects the projector to vibration associated with table use, such as people taking notes, etc. As a result, the projected image may jitter and be of a lower quality.

When projectors are used, these known and undesirable effects can significantly detract from the quality of presentation, thereby potentially dissuading customers from buying new projectors, especially for the home theater market.

BRIEF DESCRIPTION OF THE DRAWINGS

The invention is better understood with reference to the following drawings. The elements of the drawings are not necessarily to scale relative to each other; rather, emphasis has instead been placed upon clearly illustrating the invention. Furthermore, like reference numerals designate corresponding similar parts through the several views.

FIG. 2 presents a projector projecting an image on a projection surface according to one embodiment of the invention.

DESCRIPTION OF THE EMBODIMENTS

The embodiments of the invention described herein are directed to an apparatus that presents a first appliance having a first function, for example a clock for the purpose of displaying time; and presenting a second appliance having a second function, for example a projector for showing presentations or video. The apparatus easily changes from a first function to a second function and back again.

Figure 1A:
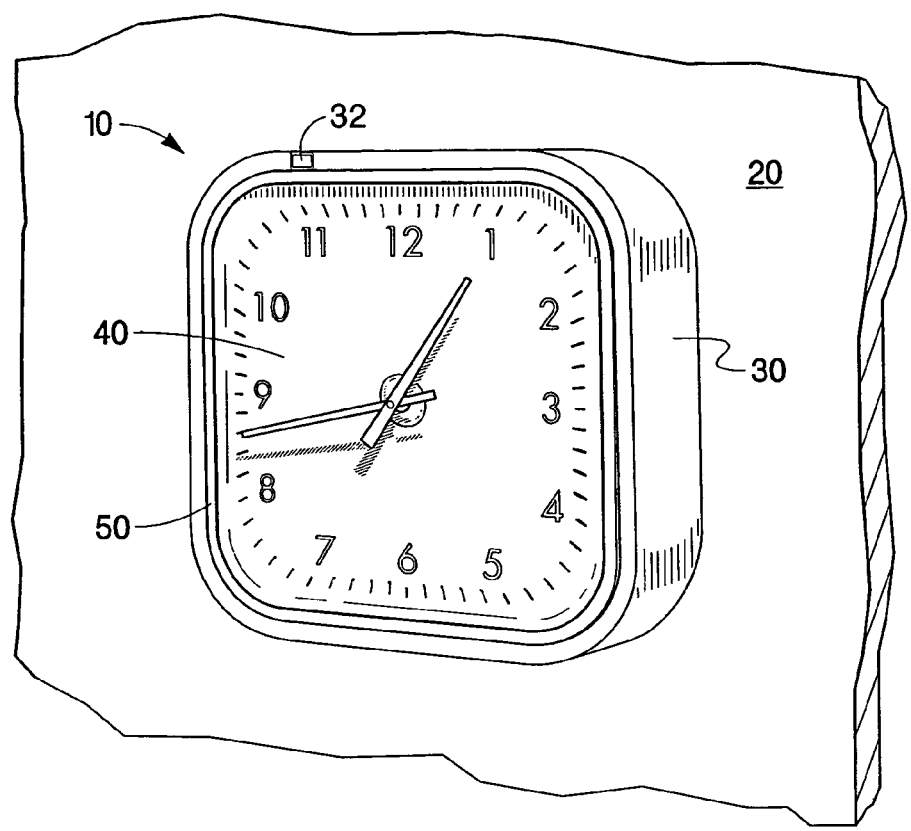
FIGS. 1A and 1B are exemplary diagrams of a front and rear view of an apparatus, respectively. The apparatus is shown in a first position thus presenting a first appliance, such as clock, according to one embodiment of the invention.

FIG. 1A shows the front side of an apparatus 10 in a first position mounted to a wall 20 according to one embodiment of the invention. Although the apparatus 10 is mounted to the wall 20, the apparatus 10 can also be placed on a tabletop, shelf or other similar surface, or be mounted to another movable or stationary object. The apparatus 10 is includes a first appliance which is shown to be an analog clock 40, coupled to a panel 50. However, other types of clocks (such as a digital clock for example) may also be used.

In the context of the present application, an appliance is a device, especially a household device, which is operated by electricity. As such, a variety of appliances could also be used in place of apparatus 10. Thus, it is not necessary that the first appliance be a clock 40. Rather, the first appliance could function as an electronic display where digital pictures are regularly updated. The first appliance could also function as a control panel or a display for a home entertainment system. The first appliance could also take the form of a weather station where the barometric pressure, wind speed, temperature or other information is presented. These are just a few examples of first appliances that could be coupled to the panel 50. However, it should be understood that these examples do not limit the types of first appliances which could be used in the invention and therefore, many other types of first appliances may also be considered.

Figure 1B:
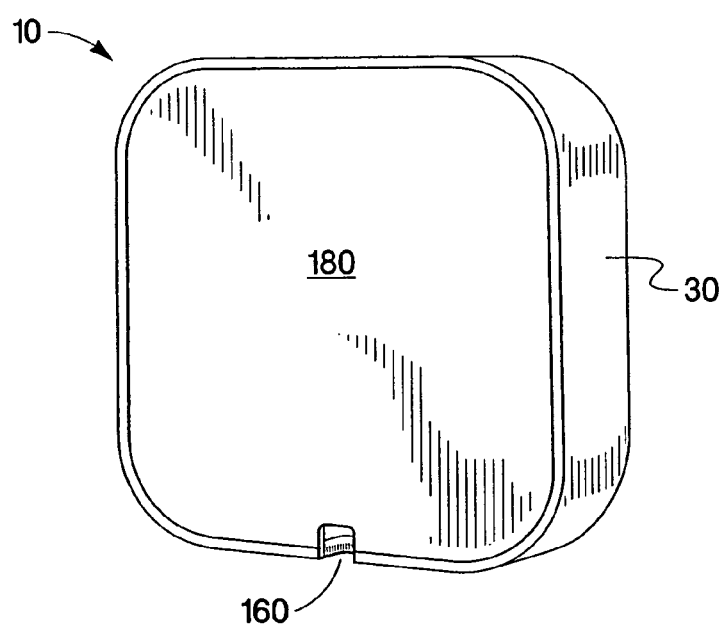

FIG. 1B shows the backside of an apparatus 10 according to one embodiment of the invention. A back wall 180 of a housing 30 has an orifice 160 which may be used for routing power cords, communication cables, and other types of cables or cords.

Returning to apparatus 10, the first appliance as shown is a clock 40 and functions to display time. The clock 40 can be battery powered or may derive power from a wall source. The clock 40 is coupled to a movable panel 50 which may be fabricated from wood, plastic, metal, cultured stone, cut stone, composite or any other type of material suitable for supporting the clock 40. The panel 50 is shown to be flat, although the panel 50 may be curved, or take on a variety of shapes for strength, ease of fit, aesthetic value, or other properties that may be desirable.

The panel 50 is movable, and sensor 32 can accept commands to alter the position of the panel 50. The details of movement are described in reference to FIG. 2 or 3. The movable panel 50 fits within a housing 30, which may also be fabricated from wood, plastic, metal, cultured stone, cut stone, composite, or any other type of material suitable for providing adequate rigidity for the apparatus 10. The housing 30 may also be shaped to enhance strength, ease of fit, aesthetic value, or other desirable properties. As such, the apparatus 10 forms an attractive, useful, and familiar shape which easily blends unobtrusively into conference rooms, conference centers, and other decor in which the apparatus 10 is placed, such as, but not limited to family or living rooms.

Figure 2:
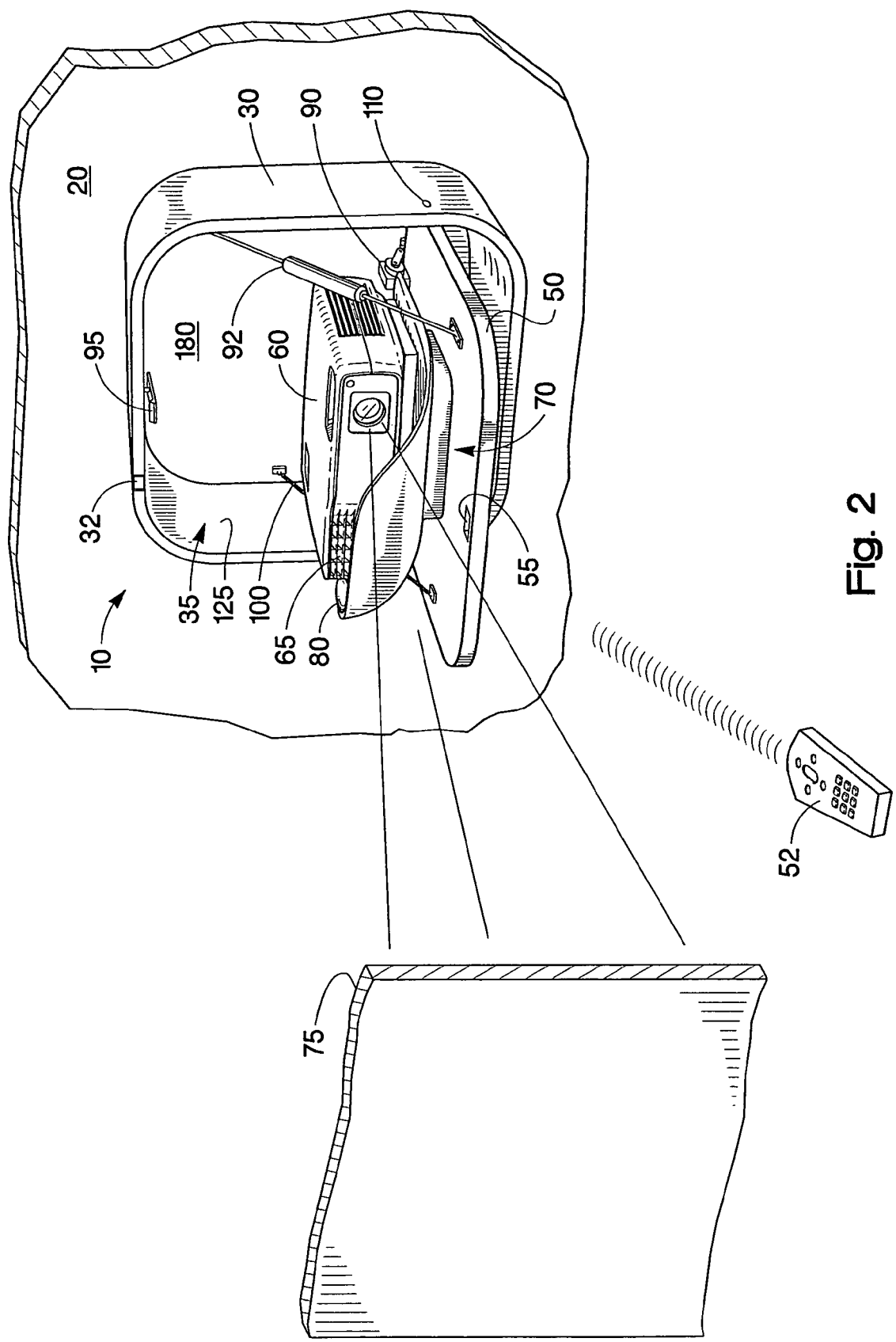
FIG. 2 is an exemplary diagram of the apparatus of FIG. 1 in a second position. Thus.

FIG. 2 shows an apparatus 10 in a second position according to one embodiment of the invention. The apparatus 10 is preferentially mounted to a wall 20. However, the apparatus 10 can also be placed on a tabletop, shelf, or other similar surface, or mounted to another movable or stationary object. In one embodiment, the apparatus 10 comprises a second appliance, such as projector 60. Projector 60 may be battery powered, especially in the situation where high efficiency light emitting diodes or laser diodes are used as a light source.

Projector 60 may also have a radio frequency or infrared video communication port for the purpose of reducing the cable routing requirements to the projector 60.

When an apparatus 10 housing a projector 60 is mounted to a wall 20, the apparatus 10 can be located at a height that closely matches the height of the center of a typical projection surface 75. When the projector 60 and the projector surface 75 are at the same height, spatial distortions common to projected images, such as key stoning, are minimized. Key stoning occurs when the projector 60 and projection surface 75 are at substantially oblique angles to each other resulting in uneven spatial variation of the projected image on the projection surface 75, as an example, when the top of the image is wider than the bottom of the image. The projection surface 75 may take the form of a screen, wall, or other suitable surface for projecting an image. Wall mounting the apparatus 10 housing a projector 60 may be advantageous because wall 20 vibration is typically less than vibrations from other surfaces, such as for example, an apparatus placed on a table top. Therefore, a projected image from an apparatus coupled to the wall 20 will generally have overall less jitter and therefore higher image quality than an image projected from another surface such as a table top.

A housing 30 creates a structural support for an apparatus 10 and can be fabricated and shaped with appropriate materials mentioned in reference to FIG. 1. A panel 50 creates a support member for the first and second apparatuses, and can also be fabricated and shaped with appropriate materials mentioned in reference to FIG. 1. The panel 50 is pivotally mounted to the housing 30 by a pivoting device 110. The pivoting device 110 is typically formed from a shaft mounted in the panel 50, whereby the shaft at least partially extends into the housing 30. Although only one pivoting device 110 is shown on the right side of housing 30, another similar pivoting device mounted between the housing 30 and the panel 50 on the left side of the housing, coaxial with pivoting device 110 provides support for the left side of the panel 50. The pivoting device 110 can take a variety of forms, such as a shaft in a bearing, coupled rotary plates, a spring loaded ball in a detent, etc. These pivoting devices are common in many apparatuses, and use of another type of pivoting device in place of pivoting device 110 may be used without departing from the intent of the invention.

A panel 50 is shown in a second downward position, thereby presenting a second appliance, for example a projector 60. When the panel 50 is in the second position, an opening 35 in a housing 30 is presented which houses a second appliance for example a projector 60. Notice that the opening 35 in the housing 30 includes the projector 60 when the panel is in position 1 as shown in FIG. 1 and exposes the projector 60 when the panel is in position 2 as shown in FIG. 2. The panel 50 serves as a platform for which a variety of devices may be mounted. A position adjustment assembly 70 is coupled to the panel 50 and the projector 60 is coupled to the position adjustment assembly 70, thereby allowing the position of the projector 60 to be adjusted relative to the projection surface 75, for example, the projector 60 can be positioned left and right, up and down, in and out, and in rotary, pitch, and yaw angular motions.

A projector 60 generates stray light, heat, and fan noise from one or more vents 65. In many situations, especially in home theater applications, it is likely that a viewer will sit in front of, and just below, the projector 60 where the heat from the projector 60 blows out of one or more of the vents 65 towards the viewer, which may make the viewer uncomfortable thereby creating an undesirable viewing experience. To solve this problem, a deflector 80 redirects the heat up and away from the viewer. The deflector 80 also serves to block undesirable stray light exiting the vents 65 and to redirect noise from the cooling fan in the projector upward and away from the viewer. The deflector 80 shrouds the vents 65 and is described in more detail in reference to FIG. 4.

To assist in lowering a panel 50 from a first position to a second position, one or more force-producing devices 100 are coupled between the panel 50 and a back wall 180 of a housing 30. The force-producing device 100 helps to equalize the weight of the panel 50, the position adjustment assembly 70, the second appliance 60, the deflector 80, and the first appliance 40, which is hidden from view by the panel 50. The force-producing device 100 is coupled between the panel 50 and the back wall 180 of the housing 30. Alternatively, the housing end of the force-producing device 100 may also be attached to any other part of the housing 30, such as, but not limited to, an inside wall 125.

One or more inertia-arresting devices 90 are provided to arrest the abrupt downward motion of a panel 50 and associated components mounted thereon, thereby delivering a smooth motion of the panel 50 when transitioning from a first position to a second position. The inertia-arresting device 90 can have different damping rates depending on whether the panel 50 is transitioning from a first position to a second position or whether the panel 50 is transitioning from the second position to the first position. The inertia-arresting device 90 is coupled between the panel 50 and a back wall 180 of the housing 30. In another embodiment, the housing end of the inertia-arresting device 90 may be attached to any other part of the housing 30, such as, but not limited to, an inside wall 125. To allow the panel 50 to transition from the first position to the second position, a latch 95 may be pressed thereby releasing a catch 55 in the panel 50. The catch 55 may be formed by a stepped recess in the panel 50 having sufficient stepped overhang to engage the latch 95. A latch 95 and catch 55 may not be needed if an actuator 92 can accomplish the task of retaining the panel 50 in a first or second position. The latch 95 can be returned by a spring when the latch 95 is not pressed. Other latch 95 return mechanisms can also be used, such as a pair of opposed permanent magnetic fields, compressible compliant membranes, etc. The latch 95 may be activated electrically, mechanically, or using other methods.

An actuator 92 may be provided between back wall 180 and panel 50. The actuator 92 is capable of motion and therefore can move the panel 50. The actuator 92 may be electrically driven for the purpose of transitioning the panel 50 from a first position to a second position or a second position to a first position, and may receive signals from a remote control 52 by way of a sensor 32.

Figure 3:
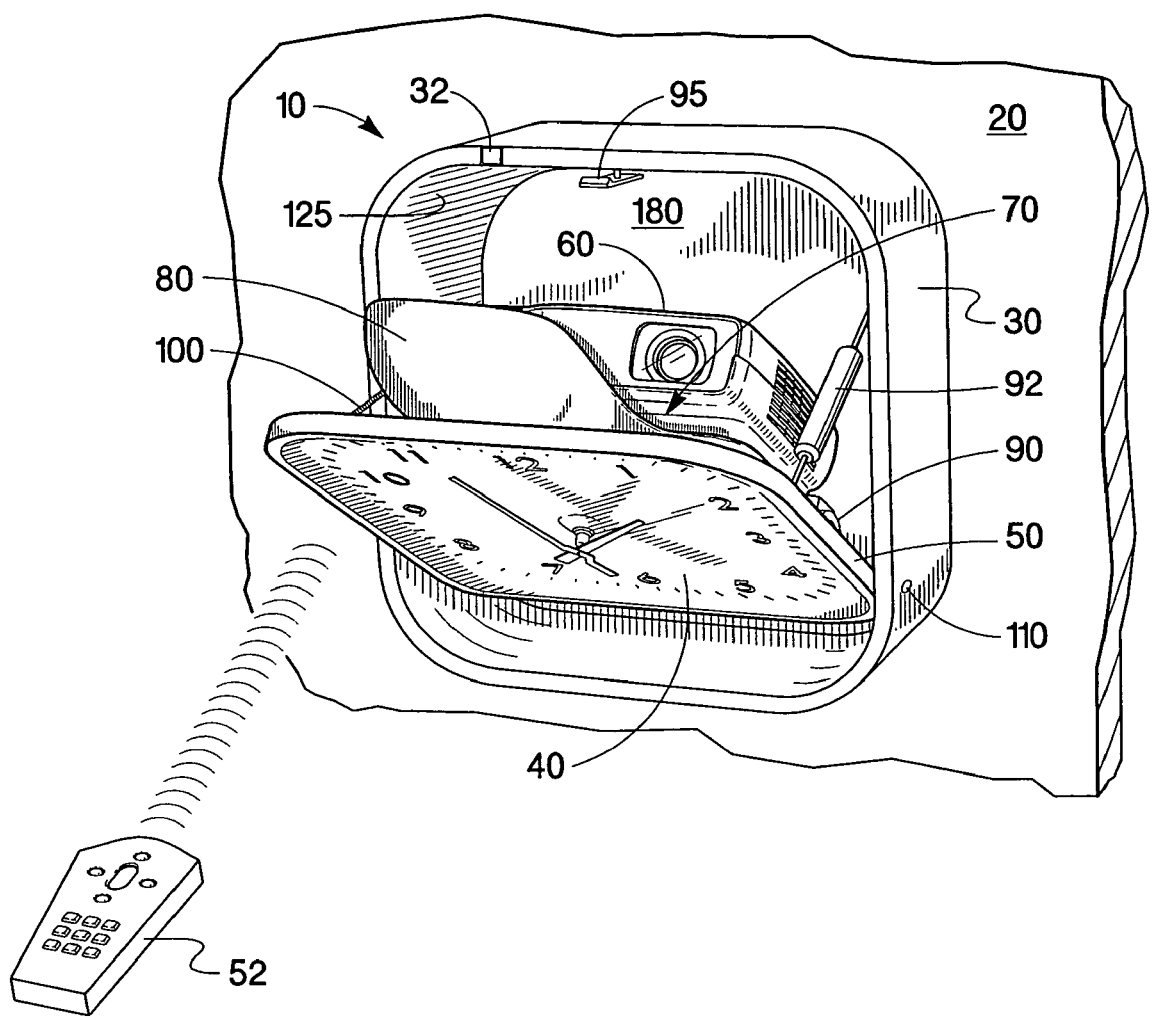
FIG. 3 is an exemplary diagram of an apparatus in transition between a first position, presenting a clock, and a second position, presenting a projector according to one embodiment of the invention.

FIG. 3 shows an apparatus 10, where a panel 50 is intermediate between a first position and a second position according to one embodiment of the invention. The panel 50 can either transition from the first position to the second position or from the second position to the first position. The position of the panel 50 shows a first appliance, for example an analog clock 40 and a second appliance, for example a projector 60. The sensor 32 may receive signals from a remote control 52 for the purpose of transitioning the panel 50 from a first to a second position or from the second position to the first position by use of actuator 92. The sensor 32 may be an optical type such as an infrared detector, a radio frequency type such as a tuned antenna, etc.

One or more force-producing devices 100 helps to counter the weight of the projector 60, the deflector 80, the position adjustment assembly 70, the panel 50 and the clock 40. The force-producing device 100 can be mounted between a back wall 180 of a housing 30 and the panel 50 as shown, or alternately mounted between an inside wall 125 of the housing 30 and the panel 50. The force-producing device 100 can also be mounted in any position between the housing 30 and the panel 50 as long as the force-producing device 100 does not interfere with the panel 50 attaining the first and the second positions.

One or more inertia-arresting devices 90 are mounted between a panel 50 and a back wall 180 of a housing 30, or between the panel 50 and an inside wall 125 of the housing 30, or between any part of the housing 30 and the panel 50 as long as the inertia-arresting device 90 does not interfere with the panel 50 attaining the first and the second position. The inertia-arresting device 90 may have different amounts of damping depending on whether the panel 50 is transitioning from a first position to a second position or from the second position to the first position. The differing amount of damping is desirable, because when transitioning the panel 50 from a first position to a second positioning, i.e. opening the panel 50, the panel lowers gracefully against the effect of gravity requiring a relatively large amount of damping. However, when the panel 50 is transitioning from a second position to a first position, i.e. closing the panel 50, it is desirable to close the panel 50 quickly, and a lower amount of damping is necessary. Once the panel 50 is in the first position, it is retained by a latch 95 and a catch 55 in the panel 50, or an actuator 92 may have sufficient force to retain the panel 50 without a latch 95 or catch 55 as shown in FIG. 2.

One or more actuators 92 are mounted between a panel 50 and a back wall 180 of a housing 30, or between the panel 50 and an inside wall 125 of the housing 30, or between any part of the housing 30 and the panel 50 as long as the actuator 92 does not interfere with the panel 50 attaining the first and the second positions. The actuator 92 or another device may accept a signal from remote control 52 by way of a sensor 32 to transition a panel 50 from the first position to the second position or the second position to the first position.

As mentioned in reference to FIG. 2, since it is desirable to match the height of a projector 60 to the height of the center of the projection surface 75, the projector 60 may be mounted on a wall 20 at a height corresponding to the center of the projection surface 75 to minimize or eliminate key stoning. When the projector 60 is not in use, it can be rotated up and away; resulting in a clock 40 being presented as shown in FIG. 1A. Since the projector 60 and the clock 40 share the same housing 30, both are at about the same height, and when a clock 40 is mounted to a wall 20, the clock 40 does not appear out of place as shown in FIG. 1A. Therefore, since both the concealed projector 60 and the clock 40 are substantially the same height they can both function unobtrusively and harmoniously within a multiple use environment such as a living room, family room, or a conference room.

Figure 4:
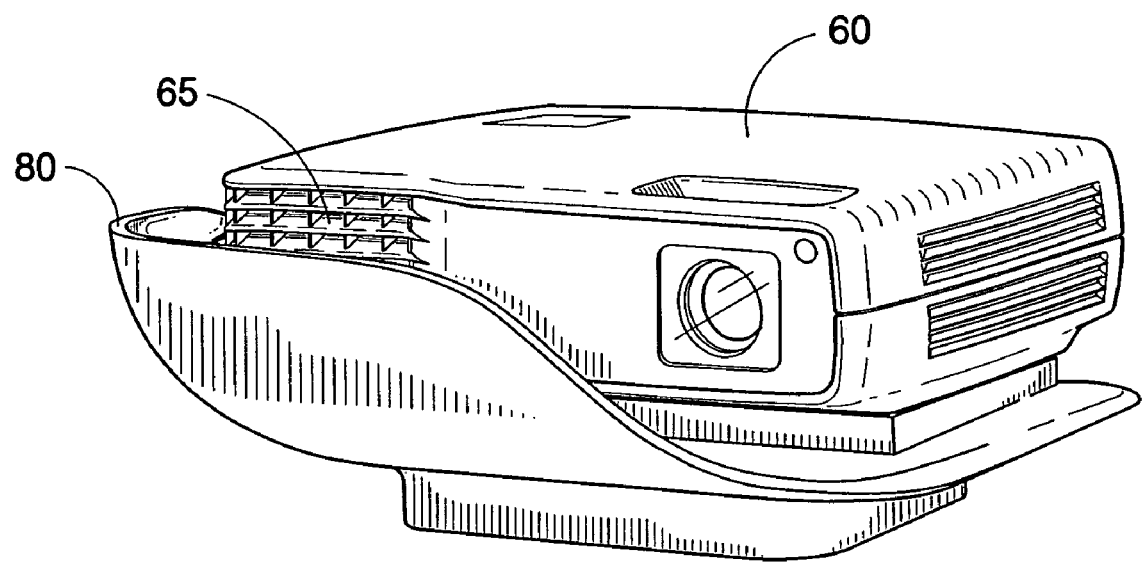
FIG. 4 is an exemplary diagram of a deflector positioned around a projector according to one embodiment of the invention.

FIG. 4 shows a deflector 80 and a second appliance, for example a projector 60, according to one embodiment of the invention. The projector 60 generates heat, light, and noise from one or more vents 65. The vents 65 are necessary to allow heat to escape from the projector. When the projector is used, especially in home theater situations, it is likely that a viewer will sit just below and in front of the projector, since the projector 60 may be mounted to a wall 20 as shown in FIG. 2. When heat is blown from one or more of the vents 65 towards the viewer, the heat may make the user feel uncomfortable, thereby creating an undesirable viewing experience. To solve this problem, a deflector 80 shrouds the vents 65 thus redirecting the heat up and away from the viewer.

A significant amount of light can leave a projector 60 through vents 65. This light escapes through the vents 65 because it is difficult to completely baffle the emitted light due to projector 60 size constraints, weight constraints and other factors. When this light is emitted from the vents 65, it creates a source of background light, which may degrade the black point in a projected image, a key attribute to image quality. The background light can also cause the viewer to perceive a different level of image contrast termed differential contrast, which may reduce the quality of images. So, for the best image quality, both the black point and differential contrast should be managed. The deflector 80 helps to improve the projected image quality by substantially reducing the amount of stray sourced from the vents 65. The deflector 80 may be fabricated or coated with a light absorptive material so that the light escaping from the vents 65 is minimally reflected from the deflector 80, resulting in a lower amount of undesirable background light.

A cooling fan is required to cool a projector lamp in a projector 60 due to the high amount of energy dissipated from the projector lamp. Audible noise from the fan emanates from vents 65 creating a source of undesirable ambient noise. For a presentation containing audio, it is very desirable to have low ambient noise, especially in home theater systems, since a viewers experience is not only dependent on the quality of the video, but also the quality of the audio. If the ambient noise is high, the volume of the sound is typically turned up to compensate for the high ambient noise, thereby attempting to preserve the quality and fidelity of the audio as measured by the dynamic range of the audio. If the noise exiting from vents 65 due to the fan is too high, the volume may be increased to a point where the sound is too loud and therefore uncomfortable to a person listening to the presentation. As previously mentioned, the deflector 80 redirects the noise from the fan up and away from the audience, thereby lowering the background noise and lessening the need to increase the volume to satisfy a viewers' experience A deflector 80 can be made from a variety of materials which can absorb or redirect sound, heat, light or other emissions from a projector 60. The deflector 80 can also be molded or fabricated from composite, multilayer, coated or other types of materials for controlling sound, heat, light and other emissions.

Figure 5:
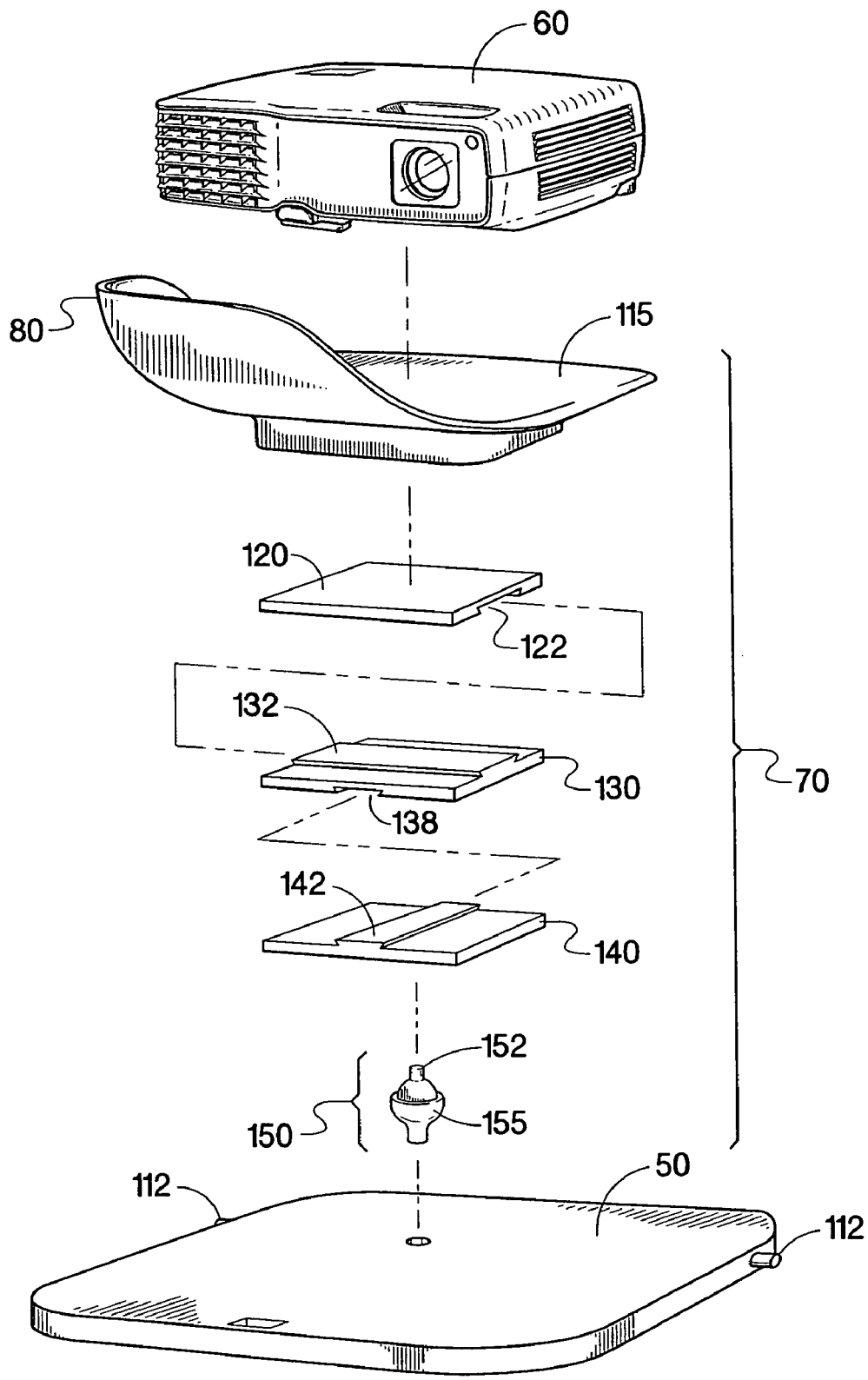
FIG. 5 is an exemplary exploded view diagram of a mechanism for translating and tilting the projector according to one embodiment of the invention.

FIG. 5 shows an exploded view of a position adjustment assembly 70 used for adjusting a projector 60 according to one embodiment of the invention. When the projector 60 is presented as shown in FIG. 2, the projected image may be appropriately positioned on a projection surface 75 using the position adjustment assembly 70. When the apparatus 10 in FIG. 2 is slightly out of position, or is angularly misaligned, the projector 60 as part of apparatus 10 will share this misalignment. The position adjustment assembly 70 can be used to center the projected image on the projection surface 75. The position adjustment assembly 70 comprises an attachment plate 115 coupled to the projector 60, a first linear sliding member 120 for moving the projector 60 left and right, a second linear sliding member 130 for moving the projector 60 forward and backward, a tilting plate 140 for pivoting the projector 60 in roll, pitch, and yaw, by use of a ball and socket assembly 150 allowing the tilting plate 140 to pivot relative to a panel 50 which serves as a base for the position adjustment assembly 70. Position adjustment assembly 70 may comprise motors, actuators, or other position adjustment devices such that position adjustments can be made under remote control 52, for example, as shown in FIG. 2.

An attachment plate 115 can be directly fastened to the projector using screws, bolts, or other fasteners. The attachment plate 115 can also be coupled to the projector using a dovetail channel that mates to the projector (not shown) or any other method of coupling. A first linear sliding member 120 comprises a channel 122. A second linear sliding member 130 comprises a protruding beam 132 and a channel 138. A tilting panel 140 comprises a protruding beam 142. A ball and socket assembly 150 comprises a ball and shaft 152 and a socket and shaft 155.

In operation, a channel 122 in a first linear sliding member 120 is coupled to a protruding beam 132 in a second linear sliding member 130 allowing relative motion in the left and right direction between the linear sliding members 120 and 130. In a similar manner, channel 138 in the second linear sliding member 130 is coupled to a protruding beam 142 in a tilting panel 140 allowing relative motion in the forward and backward direction between the members 130 and 140. A ball and socket assembly 150 allows relative movement between the tilting plate 140 and a panel 50 in the roll, pitch, and yaw directions, where the panel 50 is attached to a socket 155 portion of the ball and socket assembly 150 and the tilting panel 140 is attached to the ball portion of the ball and socket assembly 150. Coupled to the panel 50, are pivoting shafts 112 which are part of the pivoting device 110 as shown in FIG. 2. Although height adjustment has not been shown or described, mechanisms such as scissor lifts, screw lifts, etc. could be used for adjusting the height of the projector 60 relative to a projection surface 75 as shown in FIG. 2.

Although FIG. 5 shows details of a position adjustment assembly 70, other mechanisms may also be used to adjust the position of a projector 60 without departing from the intent of the invention. Also, component parts, shown in FIG. 5 can be removed, added to, reordered or reoriented without changing the intent of the invention.

Figure 6:
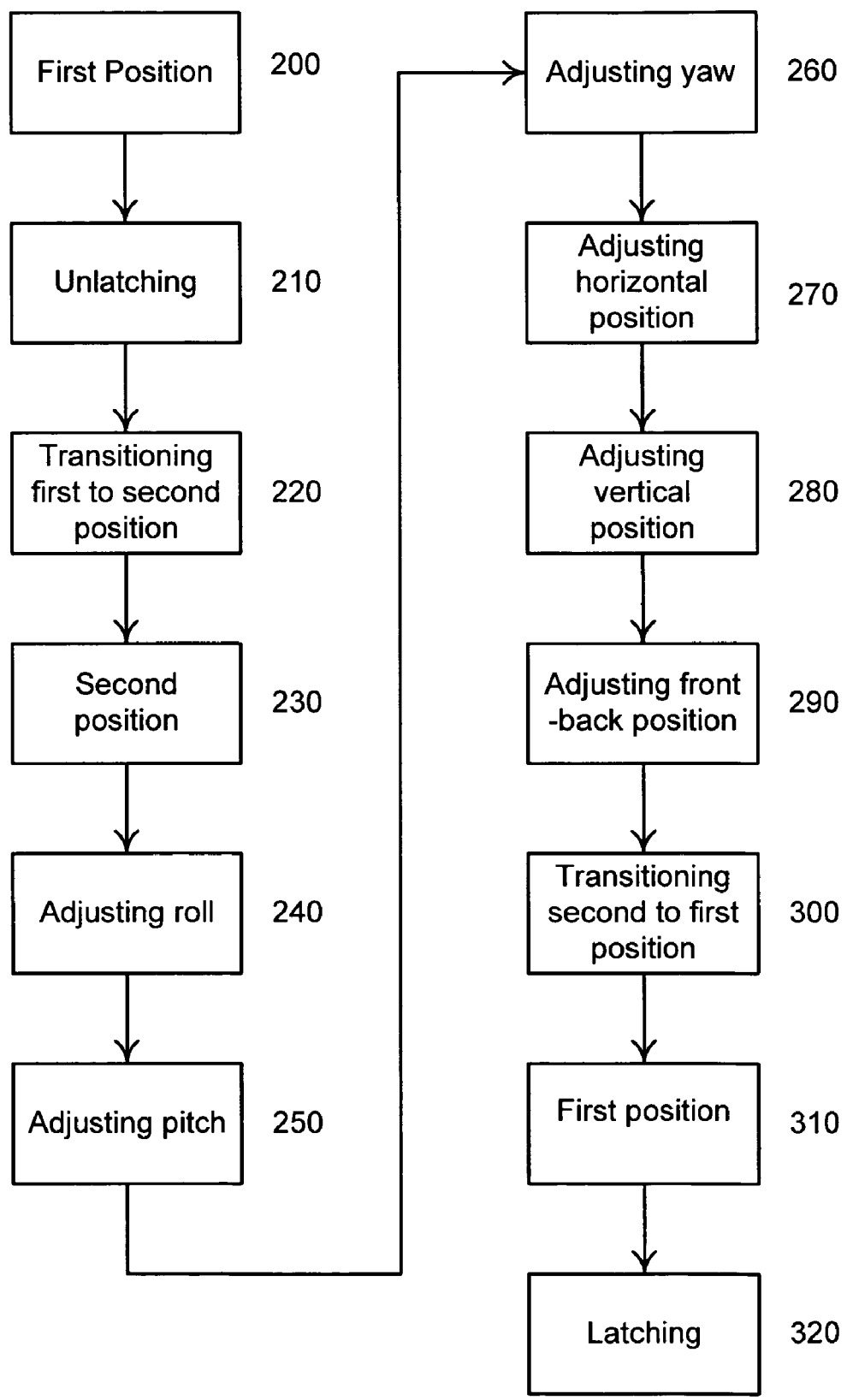
FIG. 6 is an exemplary flowchart showing the steps a user takes in interacting with the apparatus of FIGS. 1 and 2 according to one embodiment of the invention.

FIG. 6 shows the steps a user takes when presenting a first appliance, for example, a clock, in a first position presenting a second appliance, for example, a projector in a second position; adjusting the orientation of the projector, and reversing the process thereby presenting the first appliance, for example, the clock, according to one embodiment of the invention. In the preferred embodiment, an apparatus 10 is mounted to a wall 20 as shown in FIG. 1A.

In a first step 200, when the apparatus is in a first position, a clock 40 is presented as shown in FIG. 1A. The clock 40 retains its function and appearance until it is desired to use a projector.

In a second step 210, when it is desired to use a projector, a latch 95 is released, thereby freeing a movable panel 50 as shown in FIG. 2. In a situation where an actuator 92 is capable of retaining the position of the panel 50, a latch 95 may not be needed.

In a third step 220, the movable panel 50 transitions from a first position to a second position thereby presenting a projector 60 as shown in FIG. 3. The motion of the movable panel 50 is smooth and assisted by a force-producing device 100 and an inertia-arresting device 90. Alternately, or in combination with the force-producing device 100 and the inertia-arresting device 90, an actuator 92 may also be used to raise and lower panel 50 and may accept inputs from a remote control 52 by way of a sensor 32, as shown in FIG. 3.

In a fourth step 230, the movable panel 50 completely transitions from a first position to a second position thereby fully presenting a projector 60 as shown in FIG. 2.

In a fifth step 240, a roll axis of the projector 60 is adjusted by rotating the projector 60 from side to side to properly orient an image on a projection surface 75 or this adjustment can be accomplished by using a remote control 52 by way of a sensor 32, as shown in FIG. 2.

In a sixth step 250, a pitch axis of the projector 60 is adjusted by tilting the front of the projector 60 up or down to properly position the image on the projection surface 75. This adjustment can be accomplished by using a remote control 52 by way of a sensor 32, as shown in FIG. 2.

In a seventh step 260, a yaw axis of the projector 60 is adjusted by rotating the projector 60 clockwise or counter-clockwise to properly position the image on the projection surface 75. This adjustment can be accomplished by using a remote control 52 by way of a sensor 32, as shown in FIG. 2.

In an eighth step 270, a horizontal position of the projector 60 is adjusted by moving the projector 60 left and right to properly position the image on the projection surface 75. This adjustment can be accomplished by using a remote control 52 by way of a sensor 32, as shown in FIG. 2.

In a ninth step 280, a vertical position of the projector 60 is adjusted by moving the projector 60 up and down to properly position the image on the projection surface 75. This adjustment can be accomplished by using a remote control 52 by way of a sensor 32, as shown in FIG. 2.

In a tenth step 290, a forward and backward position of the projector 60 is adjusted by moving the projector forward and backward to properly position the image on the projection surface 75. This adjustment can be accomplished by using a remote control 52 by way of a sensor 32, as shown in FIG. 2.

In the eleventh step 300, the projector transitions from a second position to a first position by raising the panel 50 as shown in FIG. 3. The panel moves easily and smoothly as assisted by a force-producing device 100 and an inertia-arresting device 90. The inertia-arresting device 90 provides less damping resistance to motion when the panel 50 transitions from the second position to the first position than when transitioning the panel 50 from the first position to the second position. The less damping resistance from the second position to the first position allows quick and near effortless closure of the panel 50. An actuator 92 may also be used to transition the panel 50 from a first to second position or a second to first position, and may accept inputs from a remote control 52 by way of a sensor 32, as shown in FIG. 3.

In a twelfth step 310, the panel 50 is fully in the first position thereby presenting a clock 40 as shown in FIG. 1.

In a thirteenth step 320, the panel 50 is retained as shown in FIG. 1 by a latch 95 as shown in FIG. 3. In the case where an actuator 92 is used and the actuator 92 has sufficient force to retain the position of the panel 50, neither a latch 95 nor a catch 55 may not be needed as shown in FIG. 3.

Although the steps above represent a complete listing for setting up and using the apparatus 10 shown in FIG. 1, after a projector 60 is adjusted to the projection surface 75 as shown in FIG. 2, typically the following seven steps are used: Step 200 where an apparatus 10 is in a first position presenting a clock 40 as shown in FIG. 1. Step 210 where a latch 95 is released as shown in FIG. 3. Step 220 where the apparatus 10 is transitioning from the first position to a second position to present a projector 60 as shown in FIG. 3. Step 230 where the apparatus 10 is fully in the second position and a projector 60 is presented as shown in FIG. 2. Step 300 where, when the projector 60 is no longer used, the apparatus 10 is transitioning from the second position to the first position to present a clock 40 as shown in FIG. 3. Step 310 where the apparatus 10 is fully in the first position and the clock 40 is presented. Finally, step 320 where the apparatus 10 fully latches the panel 50 in the first position as shown in FIG. 1, retained by latch 95 as shown in FIG. 3 and a catch as shown in FIG. 2. Steps 210 where latch 95 is released, and step 320 where latch 95 is engaged may not be needed if an actuator 92 is used, where the actuator 92 has sufficient force to retain a panel 50 as shown in FIG. 3. If latch 95 is not needed, then catch 55 is also not needed as shown in FIG. 2.

Embodiments of the invention overcome many of the problems associated with acceptance of projector based systems for conference room, home theater, and other applications. Embodiments of the invention elegantly transform between a first appliance, for example a wall clock and a second appliance such as a projector, and in doing so, eliminates unsightly, distracting, and potentially dangerous trip hazards associated with cabling when projectors are placed on table tops. By preferentially mounting a projector on a wall, the height of the projector can be complementary mounted to the height of a projection surface, thereby eliminating or minimizing key stoning. Wall mounting typically reduces the amount of vibration coupled to the projector, thereby improving the projected image quality. A deflector eliminates or reduces the amount of audible noise, light, and heat from the projector; all which detract from the quality of an audio visual presentation. When the projector is not in use, it is hidden from view, and an appropriate functional appliance is presented, such as a clock, thereby harmoniously blending into a conference room or home theater environment.

In conclusion, while the present invention has been particularly shown and described with reference to various embodiments, those skilled in the art will understand that many variations may be made therein without departing from the spirit and scope of the invention as defined in the following claims. This description of the invention should be understood to include the novel and non-obvious combinations of elements described herein, and claims may be presented in this or a later patent application to any novel and non-obvious combination of these elements. The foregoing embodiments are illustrative, and no single feature or element is essential to all possible combinations that may be claimed in this or a later patent application. Where the claims recite "a" or "a first" element or the equivalent thereof, such claims should be understood to include incorporation of one or more such elements, neither requiring nor excluding two or more such elements.

What is claimed is:

1. An apparatus, comprising:
    a housing having an opening;
    the opening being covered by a panel pivotally connected to the housing;
    a clock face coupled to a first side of the panel; and
    a projector coupled to a second side of the panel for projecting images on a surface opposite the apparatus.

2. The apparatus of claim 1, further comprising
    an inertia-arresting device.

3. The apparatus of claim 1, further comprising a position adjustment assembly coupled to the panel for adjusting a position of said projector relative to said panel.

4. The apparatus of claim 3, wherein the position adjustment assembly comprise a sensor for receiving commands from a remote control unit.

5. The apparatus of claim 3, wherein the position adjustment assembly comprises at least one of the following:
    a roll adjustment mechanism;
    a pitch adjustment mechanism;
    a yaw adjustment mechanism;
    a left and right adjustment mechanism;
    a vertical adjustment mechanism; and
    a forward and backward position adjustment mechanism.

6. The apparatus of claim 3 further comprising a deflector coupled to the position adjustment assembly, wherein the deflector shrouds a vent in a projector.

7. A method for alternately presenting and concealing a projector in an apparatus, comprising:
    attaching a clock face to a first side of a movable panel so that said clock face moves with said panel and attaching a projector to a second, opposite side of said movable panel so that said projector moves with said movable panel;
    wherein transitioning the movable panel into a first position conceals the projector and presents the clock face; and
    wherein transitioning the movable panel into a second position presents the projector.

8. The method of claim 7 further comprising:
    adjusting the roll of the projector;
    adjusting the pitch of the projector;
    adjusting the yaw of the projector;
    adjusting the left and right position of the projector;
    adjusting the vertical position of the projector;
    adjusting the forward and backward position of the projector.

9. The method of claim 7, wherein transitioning the movable panel includes releasing a latch.

10. The method of claim 7, wherein transitioning the movable panel includes arresting the motion of the panel to keep the panel from abruptly moving.

11. The method of claim 7, further comprising transitioning the movable panel by actuation of an actuator.

12. An apparatus, comprising:
    means for housing an appliance, the means for housing the appliance having an opening;
    means for covering the opening;
    means for pivotally connecting the means for covering the opening to the means for housing the appliance;
        means for displaying time coupled to means for covering the opening so as to move with said means for covering the opening; and
        means for projecting an image coupled to the means for covering the opening so as to move with said means for covering the opening.

13. The apparatus in claim 12, further comprising means for adjusting the position of the means for projecting an image.

14. The apparatus in claim 12, comprising means for covering and exposing the opening.

15. The apparatus in claim, 12, further comprising means for arresting inertia coupled to the means for exposing the opening.

16. The apparatus in claim 12, further comprising means for assisting the means for covering the opening.

17. The apparatus in claim 12, further comprising at least one of the following:
    a means for latching the means for covering the opening; and
    a means for unlatching the means for covering the opening.

18. The apparatus in claim 12, further comprising means for actuating the means for covering an opening.

* * * * *

UNITED STATES PATENT AND TRADEMARK OFFICE
CERTIFICATE OF CORRECTION

| | | |
|---|---|---|
| PATENT NO. | : 8,246,181 B2 | Page 1 of 1 |
| APPLICATION NO. | : 11/260070 | |
| DATED | : August 21, 2012 | |
| INVENTOR(S) | : Brittany Davis et al. | |

It is certified that error appears in the above-identified patent and that said Letters Patent is hereby corrected as shown below:

In column 10, line 48, in Claim 15, delete "claim," and insert -- claim --, therefor.

Signed and Sealed this
Fifth Day of February, 2013

Teresa Stanek Rea
*Acting Director of the United States Patent and Trademark Office*